United States Patent [19]

Chen

[11] Patent Number: 5,303,054
[45] Date of Patent: Apr. 12, 1994

[54] LINE ELECTRON BEAM LIGHT SOURCE FOR PROJECTION LCD SYSTEM

[75] Inventor: Hsing-Yao Chen, Barrington, Ill.

[73] Assignee: Chunghwa Picture Tubes, Ltd., Taoyuan, Taiwan

[21] Appl. No.: 61,552

[22] Filed: May 17, 1993

[51] Int. Cl.$^5$ .............................................. H04N 5/74
[52] U.S. Cl. ...................... 348/766; 359/48; 313/441; 348/776
[58] Field of Search .............. 358/231, 236, 237; 313/422, 421, 441, 446; 359/48; H04N 9/31, 5/74

[56] References Cited

U.S. PATENT DOCUMENTS

| | | | |
|---|---|---|---|
| 4,931,652 | 5/1990 | Nakamura | 358/231 |
| 4,951,150 | 8/1990 | Browning | 358/236 X |
| 5,089,883 | 2/1992 | Welker et al. | 358/236 X |
| 5,103,328 | 4/1992 | Numao | 359/53 |
| 5,128,782 | 7/1992 | Wood | 359/48 |
| 5,135,300 | 8/1992 | Toide et al. | 353/31 |
| 5,175,637 | 12/1992 | Jones et al. | 359/48 |

*Primary Examiner*—Mark R. Powell
*Attorney, Agent, or Firm*—Emrich & Dithmar

[57] ABSTRACT

A projection liquid crystal display (LCD) system includes an LCD panel including a first plurality of horizontally aligned transparent conductive scanning electrodes and a second plurality of vertically aligned transparent conductive signal electrodes disposed on opposed surfaces of the panel. Light directed onto the aft surface of the display panel is transmitted through the panel as each horizontal linear array of first scanning electrodes is turned "ON", with the horizontal linear arrays sequentially turned on for vertically scanning the display panel in a stepwise manner. Liquid crystal display backlighting is provided by a cathode ray tube (CRT) having a phosphor-bearing faceplate which emits light when energetic electrons in the form of a horizontal, linear, elongated beam are incident thereon. An electron beam source in the CRT including, in combination, an elongated, linear wire-like cathode and a focusing concave charged electrode disposed about the cathode and having an electron-passing slot extending substantially the entire length thereof directs an elongated, linear, horizontally aligned electron beam across the width of the CRT's faceplate. A pair of spaced, charged plates disposed adjacent the electron-passing slot in the focusing electrode deflect the electron beam vertically over the faceplate in a stepwise manner and synchronously with actuation of the scanning electrodes to illuminate only that portion of the display panel containing video information for improved video image contrast and more efficient backlighting.

20 Claims, 2 Drawing Sheets

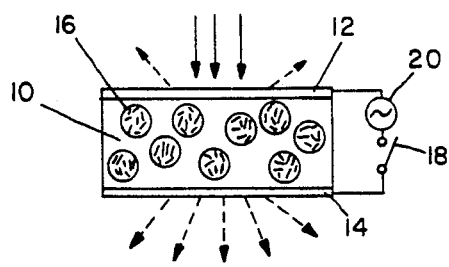
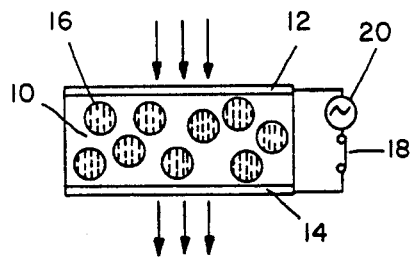
ELECTRIC FIELD OFF-
SCATTERING
*FIG.1a*
ELECTRIC FIELD ON-
TRANSPARENT
*FIG.1b*
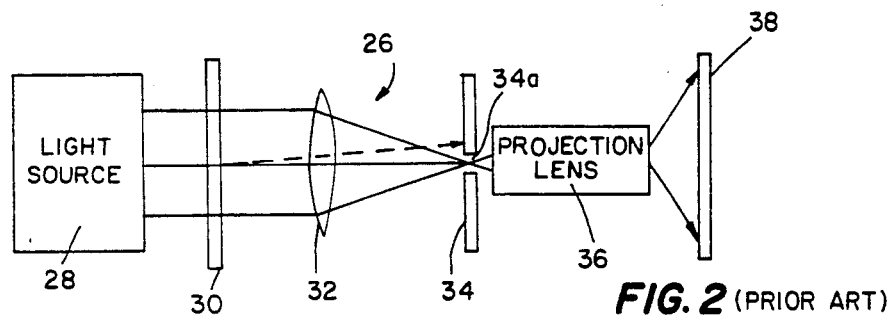
*FIG. 2* (PRIOR ART)
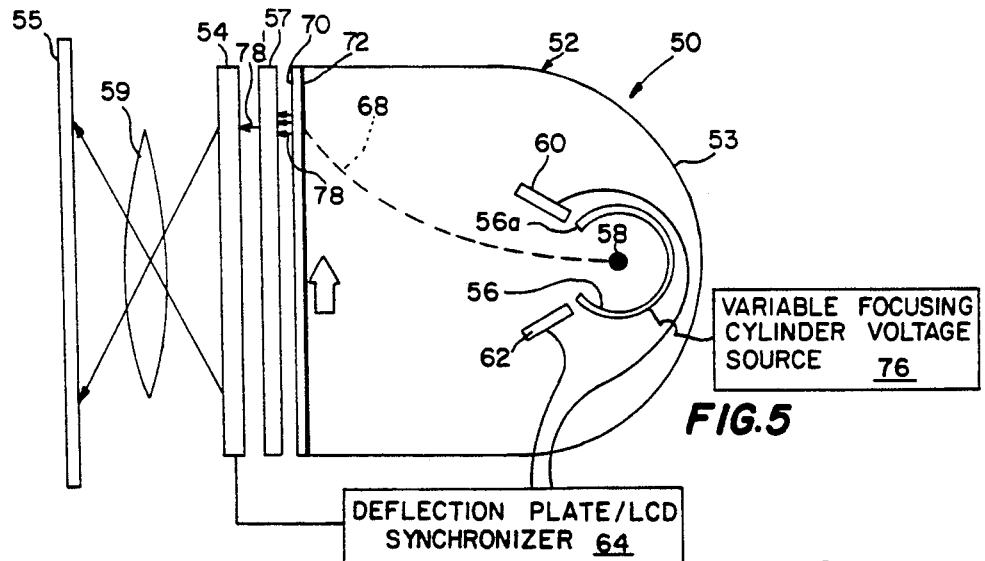
*FIG.5*
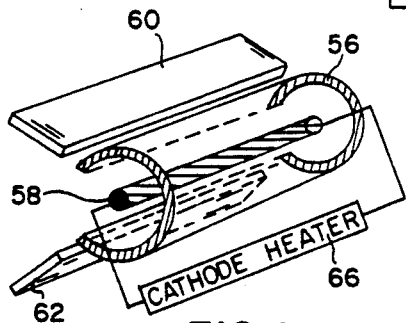
*FIG.6*
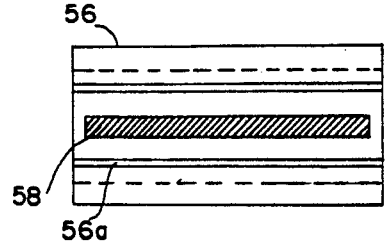
*FIG.8*
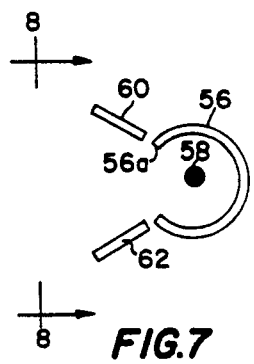
*FIG.7*

ND_LINE ELECTRON BEAM LIGHT SOURCE FOR PROJECTION LCD SYSTEM

FIELD OF THE INVENTION

This invention relates generally to projection liquid crystal displays (LCDs) such as used in television receivers and computer terminals and is particularly directed to a backlighting arrangement for a projection LCD display which provides improved video image contrast and more efficient display backlighting.

BACKGROUND OF THE INVENTION

Liquid crystal displays (LCD's) are commonly used in television receivers, portable computer displays, and other electronic devices. An LCD requires a source of backlight for operation because the LCD operates effectively as a light valve, allowing transmission of light in one state and blocking transmission of light in a second state. The typical LCD panel structure includes a liquid crystal polymer encapsulated between at least two planar glass plates in parallel with each other. A polarization layer is bonded to the outer surface of each glass plate such that the glass plates are sandwiched between two polarization layers.

The inner surface, or the surface facing the liquid crystal polymer, of each glass plate includes mutually perpendicularly oriented, conductive, transparent linear arrays of electrodes. The volume of the liquid crystal polymer between any two orthogonal arrays of electrodes forms a cube whose face area constitutes a pixel. The electrode arrays are connected on the periphery of the glass plates via input/output (I/O) strips for coupling to electronic circuitry for applying a voltage to the two sets of orthogonal conductive transparent electrode arrays. To one set of linear, parallel arrays of electrodes is provided video image information (typically to the vertically aligned electrodes), while to the other linear, parallel array of electrodes (typically the array oriented horizontally) are provided "ON" signals in a sequential manner such that each horizontal linear array of electrodes is sequentially turned on rendering the portion of the liquid crystal polymer adjacent the turned-on electrode array transparent for presenting a portion of the video image. The vertically aligned electrodes are known as "signal" electrodes, while the horizontally aligned electrodes are commonly referred to as "scanning" electrodes.

Referring to FIGS. 1a and 1b, the basic operating principal of an LCD is shown in simplified schematic diagram form. As shown in FIG. 1a, the liquid crystal polymer 10 is disposed intermediate first and second transparent electrodes 12 and 14. The aforementioned polarization layers on each side of the liquid crystal polymer 10 are omitted from the figures for simplicity. The liquid crystal polymer 10 is illustrated in simplified form as comprised of a plurality of molecules 16. A voltage source 20 couples the first and second transparent electrodes 12, 14 via a switch 18 which is shown open in FIG. 1a. Without a voltage applied across the liquid crystal polymer 10, the liquid crystal molecules 16 are randomly oriented as shown in FIG. 1a and incident light (shown in the figure as solid arrows) is randomly scattered by the liquid crystal polymer 10 as shown by the arrows in dotted-line form. With switch 18 closed and a voltage applied across the liquid crystal polymer 10, the liquid crystal molecules 18 become aligned and render the liquid crystal polymer transparent. Thus, light incident upon the liquid crystal polymer 10 is transmitted therethrough as shown in FIG. 1b.

In a conventional projection type LCD display, such as shown in simplified schematic diagram form in FIG. 2 as element 26, a light source 28 is placed behind the LCD panel 30 to illuminate the panel and project a video image. Light source 28 may be a fluorescent discharge tube or a metal halide or Xenon arc lamp. The projected video image from LCD panel 30 is focused by means of a lens 32 and directed through an aperture 34a in an aperture stop 34. A projection lens unit 36 then projects the video image onto the aft surface of a projection screen 38.

At any point during operation, the LCD panel 30 has only one horizontal line "ON," with only this line allowing for transmission of light through the panel. Facing electrodes adjacent all other horizontal lines in the LCD panel 30 are OFF. Therefore, most of the light from the light source 28 is blocked by the non-transmitting portions of the LCD panel and converted to heat. This arrangement is characterized by low light utilization efficiency, the generation of a substantial amount of heat which must be dissipated, and limited brightness and contrast because of the substantial portion of backlighting which is scattered by the non-transparent portion of the LCD panel. With 525 horizontal scan lines in a conventional projection LCD system, it can be seen that with only 1/525th of the input light utilized for producing a useful image, much energy is wasted in a conventional projection LCD system. This waste will increase in future systems employing high definition television (HDTV) displays which employ over 1000 horizontal scan lines and which will reduce light utilization efficiency even further. In order to increase image brightness and contrast, more powerful light sources are being developed. These more powerful light sources providing more lumens per watt will produce even more heat and make component cooling and heat dissipation even more important design considerations.

This invention addresses the aforementioned limitations of the prior art by providing a backlighting source for a projection LCD system which brightly illuminates only that portion of the LCD panel rendered transparent and containing video information and which maintains the backlighting beam on the transparent portion as it is displaced on the display panel.

OBJECTS AND SUMMARY OF THE INVENTION

Accordingly, it is an object of the present invention to provide improved and more efficient backlighting for a projection type LCD system.

It is another object of the present invention to provide backlighting for only that portion of an LCD display panel which is turned "ON", or contains video information, for more efficient video image backlighting and the reduction of backlight scattering by the display panel.

Yet another object of the present invention is to provide improved contrast and brightness in a backlit LCD panel by illuminating only that portion of the panel upon which video information is presented.

A further object of the present invention is to provide a novel CRT for backlighting an LCD panel.

A still further object of the present invention is to provide a CRT for backlighting an LCD panel, where the CRT's electron beam is shaped and displaced so as to limit the backlight from the CRT's faceplate to only that portion of the LCD panel rendered transparent for displaying a portion of the video image.

These objects of the present invention are achieved and the disadvantages of the prior art are avoided by a video projection display apparatus for projecting a video image on a screen comprising: a liquid crystal display panel including a generally planar layer of liquid crystal material and a first plurality of transparent scanning electrodes and a second plurality of transparent signal electrodes respectively disposed on first and second facing surfaces of the layer of liquid crystal material, wherein the first and second pluralities of electrodes are respectively arranged in first and second linear, spaced, parallel arrays and wherein the first and second arrays are mutually orthogonal such that each of the first linear arrays of scanning electrodes crosses each of the second linear arrays of signal electrodes, and wherein a voltage is applied to each linear array of scanning electrodes in a sequential manner such that video image information is presented sequentially on the liquid crystal display as a voltage is applied to each linear array of scanning electrodes; a cathode ray tube (CRT) including: a faceplate disposed in facing relation to the second surface of the layer of liquid crystal material, the faceplate having a layer of phosphor elements disposed on an inner surface thereof; an electron beam source for directing an elongated, linear beam of energetic electrons on the inner surface of the faceplate and forming a narrow, elongated, linear light beam directed toward the liquid crystal display panel as the energetic electrons strike the phosphor elements, and wherein the elongated, linear light beam and beam of electrons are aligned generally parallel to the first linear arrays of scanning electrodes; and a deflection arrangement for deflecting the electron beam over the inner surface of the faceplate in a direction generally transverse to a longitudinal axis of the beam; and a controller coupled to the first plurality of scanning electrodes and to the deflection arrangement for synchronously applying a voltage to each linear array of scanning electrodes and deflecting the electron beam in a timed manner such that the light beam is sequentially directed upon each linear array of scanning electrodes as a voltage is applied to the array of scanning electrodes.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 1a and 1b are simplified schematic diagrams of an LCD panel respectively showing the LCD panel non-transparent where incident light is scattered by the LCD panel and transparent by the application of an electric field across the LCD panel;

FIG. 2 is a simplified combined schematic and block diagram of a prior art projection type LCD display;

FIG. 5 is a simplified schematic sectional view of a line electron beam light source for backlighting an LCD panel in accordance with the present invention;

FIG. 6 is a perspective view of an electron beam source and beam deflection arrangement for use in the line electron beam light source of the present invention;

FIG. 7 is a transverse sectional view of the electron beam source and deflection arrangement combination shown in FIG. 6;

FIG. 8 is a front elevation view of the electron beam source and deflection arrangement combination shown in FIG. 7 taken along site line 8—8 therein.

DETAILED DESCRIPTION OF THE PREFERRED EMBODIMENTS

Figure 3:
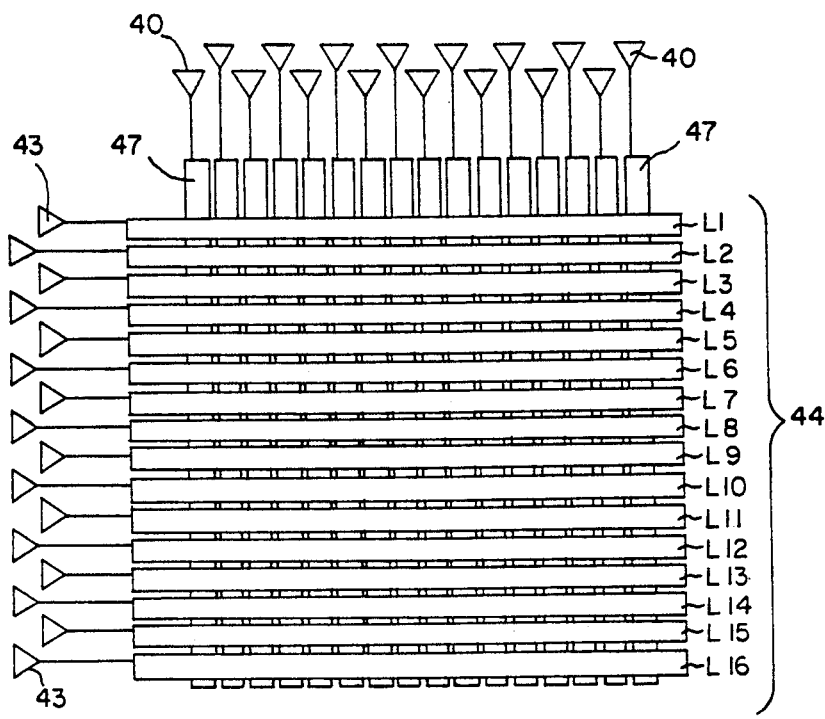
FIG. 3 is a schematic front elevation view of an LCD panel for use with the backlighting source of the present invention.
Figure 4:
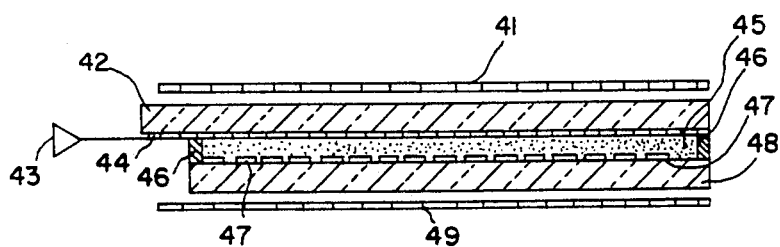
FIG. 4 is a schematic longitudinal cross sectional view of the LCD panel shown in FIG. 3.

Referring to FIGS. 3 and 4, there are respectively shown schematic top plan and longitudinal cross-sectional views of a liquid crystal display device with which the backlighting source of the present invention is intended for use. Sixteen transparent conductive scanning electrodes 44 ($L_1$ to $L_{16}$) having a strip shape are formed in parallel with each other on the inner surface of a transparent substrate 42, and sixteen transparent conductive signal electrodes 47 for applying a video signal having a strip shape are formed in parallel with each other on the inner surface of a transparent substrate 48. A ferrolectric liquid crystal layer 45 is formed between the transparent substrates 42 and 48 and is sealed by a sealing element 46. Respective drivers 43 are connected to the respective scanning electrodes 44 ($L_1$ to $L_{16}$) so as to apply a voltage $V_c$ thereto. Respective drivers 40 are connected to the respective signal electrodes 47 so as to apply a voltage $V_s$ thereto. Polarizers 41 and 49 arranged to have a crossed Nicols relation are disposed oppositely to each other, and the backlighting source of the present invention is located adjacent the outer surface of polarizer 49, although this is not shown in the figure for simplicity.

Portions where the respective electrodes 44 and electrodes 47 overlap form picture elements. Voltages $V_c$ and $V_s$ are applied to corresponding electrodes 44 and 47 so as to bring a picture element formed by one of the signal electrodes 47 to a bright state. In this matrix type display panel, a direct current voltage is sequentially applied to each of the scanning electrodes 44 in typically proceeding upward along the liquid crystal layer 45. As the direct current voltage is applied to each of the scanning electrodes 44, the portion of the video image adjacent the scanning electrode to which the direct current voltage is applied is visible on the liquid crystal layer 45. A direct current voltage is sequentially applied to each of the vertically aligned scanning electrodes 44 such that the video image presented on the liquid crystal layer 45 appears uniform and continuous.

Referring to FIG. 5, there is shown a simplified schematic diagram of a line electron beam light source 50 in accordance with the present invention. The line electron beam light source 50 includes a CRT 52 having a glass envelope 53 with a generally flat, glass faceplate 70 on a front portion thereof. The flat faceplate 70 is securely attached in a sealed manner to the forward portion of the glass envelope 52 by conventional means such as a glass frit. The glass envelope 53 is evacuated and contains a cathode 58, a charged focusing electrode 56 and first and second charged deflection plates 60 and 62. The combination of cathode 58, focusing electrode 56 and the first and second deflection plates 60, 62 is shown in perspective view in FIG. 6 as well as in an end-on view in FIG. 7. A front elevation view of the open portion of the focusing cylinder 56 and cathode 58 taken along site line 8—8 in FIG. 7 is shown in FIG. 8.

Cathode 58 may be comprised of any of the more conventional materials which emit energetic electrons when heated which materials are well known to those skilled in the relevant art. Cathode 58 is coupled to a cathode heater 66 as shown in FIG. 6 for emitting electrons when heated. Disposed substantially about and concentric with cathode 58 is the focusing electrode 56. Although in this embodiment of the invention focusing electrode 56 is shown having a cylindrical shape, the focusing electrode is not limited to this configuration as virtually any concave shape capable of focusing the energetic electrons emitted by cathode 58 would operate equally as well in the present invention. Whatever concave shape focusing electrode 56 assumes, cathode 58 is preferably located on a focal axis of the elongated electrode. Thus, in the embodiment shown in FIG. 5, cathode 58 is located on the center axis of the cylindrically shaped focusing electrode 56.

Focusing electrode 56 includes an elongated opening, or slot, 56a extending the length thereof. Energetic electrons emitted by heated cathode 58 are discharged from the focusing electrode 56 through slot 56a and form a beam 68 of energetic electrons (shown in dotted-line form in FIG. 5) in the direction of faceplate 70. Focusing electrode 56 is coupled to and charged by a variable voltage source 76. Focusing cylinder 56 is maintained at a voltage more negative than that of the cathode 58 by the variable voltage source 76 to cause the energetic electrons to be emitted from the cylinder's elongated slot 56a. Electron beam 68 is in the form of an elongated, linear beam extending substantially the entire width of faceplate 70. With cathode 58 disposed on the focal axis of focusing electrode 56, the electrons emitted through slot 56a are in the form of a flat, vertically narrow and horizontally extended beam which is focused on the inner surface of faceplate 78. Variable voltage source 76 controls the voltage of the focusing electrode 56 for allowing the current density of electron beam 68 to be varied with changes in the intensity of a video image presented on an LCD panel 54 disposed in front of faceplate 70. In another embodiment, variable voltage source 76 may be coupled to cathode 58 for controlling electron emission by the cathode and thus electron beam current density in accordance with video image intensity.

Disposed adjacent slot 56a within focusing electrode 56 are first and second deflection plates 60, 62. Each of the deflection plates 60, 62 is generally flat and extends substantially the entire length of focusing electrode 56. Each of the deflection plates 60, 62 is aligned radially relative to the concentric arrangement of cathode 58 and focusing electrode 56. Thus, the respective planes of the generally flat first and second deflection plates 60, 62 extend through cathode 58. In addition, the first and second deflection plates 60, 62 are respectively disposed adjacent upper and lower portions of slot 56a in focusing electrode 56. The first and second deflection plates 60, 62 are each coupled to a deflection plate/LCD synchronizer 64 for providing variable voltages to the two deflection plates synchronously with horizontal scanning of the video image on the LCD panel 54. By changing the relative voltages on the first and second deflection plates 60, 62 in a timed, stepwise manner, electron beam 68 is vertically displaced in increments over the inner surface of faceplate 70 which is provided with a layer of phosphor elements 72. In this manner, electron beam 68 is incrementally displaced in a stepwise manner upwardly in the direction of the arrow in FIG. 5 over faceplate 70 so as to direct a light beam emitted by the layer of phosphor elements 72 in an upwardly sweeping manner onto the inner surface of LCD panel 54.

By applying a more negative voltage to the second deflection plate 62 relative to the voltage of the first deflection plate 60, the electron beam 68 may be deflected upwardly as shown in FIG. 5. Reversing the relative voltages applied to the first and second deflection plates 60, 62 will cause the electron beam 68 to be deflected downwardly onto a lower portion of faceplate 70. In this manner, electron beam 68 may be deflected to a position adjacent to the actuated horizontal array of scanning electrodes on LCD panel 54 for illuminating only that portion of the panel displaying a portion of the video image. The deflection plate/LCD synchronizer 64 thus actuates the horizontal arrays of scanning electrodes synchronously with changes in the voltages applied to the first and second deflection plates 60, 62 to ensure that the light emitted by the faceplate's layer of phosphor elements 72 is directed only onto that portion of the LCD panel 54 containing video image information.

As shown in FIG. 5, the energetic electrons in electron beam 68 incident upon the layer of phosphor elements 72 on the inner surface of faceplate 70 direct an unfocused light beam 78 outward from the front surface of the faceplate. A focusing lens 57 is disposed intermediate faceplate 70 and the LCD panel 54 for focusing the unfocused light beam 78 to a focused beam 78' incident upon the inner surface of the LCD panel 54. Focusing lens 57 is comprised of an array of small optical lenses for focusing the light beam 78 emitted from faceplate 70 to a thin, elongated focused beam 78' extending across the width of LCD panel 54. Disposed adjacent to the front surface of the LCD panel 54 is a projection screen 55 upon which the LCD's video image is projected. A second focusing lens 59 is disposed intermediate LCD panel 54 and projection screen 55 for focusing a video image on the projection screen.

LCD panel 54 is therefore illuminated only on that portion of the panel which is transparent and contains video image information. Other portions of the LCD panel 54 which are not transparent do not receive any light and thus do not contribute to background brightness which affords improved video image contrast which is defined as $$C_{max} = \frac{L_{max}}{L_{min}}$$

where
$C_{max}$ = maximum contrast,
$L_{max}$ = maximum illumination of the display, and
$L_{min}$ = minimum illumination on the screen.

Figure 9:
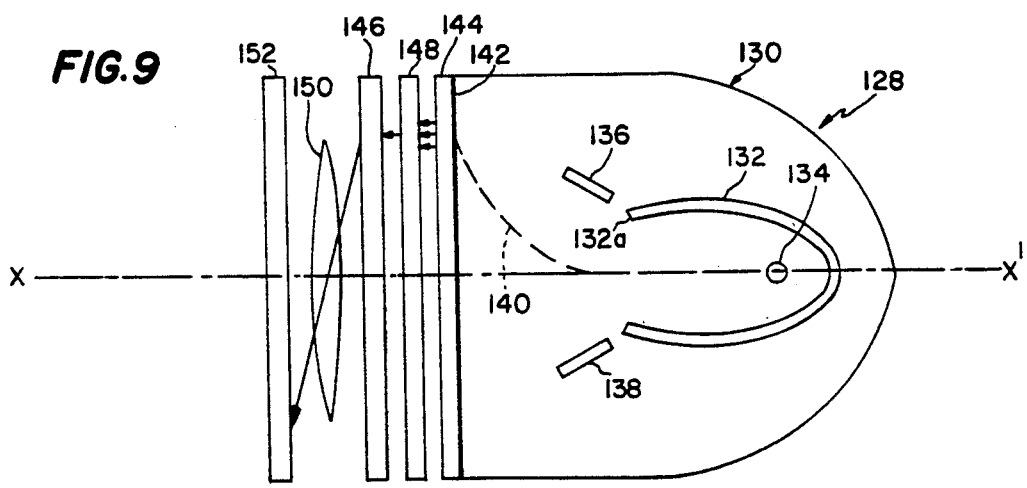
FIG. 9 is a simplified schematic sectional view of another embodiment of a line electron beam light source for backlighting an LCD panel incorporating an elliptical beam focusing electrode in accordance with the present invention.

Referring to FIG. 9, there is shown a simplified schematic sectional view of another embodiment of a line electron beam light source 128 for backlighting an LCD panel 146 incorporating an elliptical beam focusing electrode 132 in accordance with the present invention. The line electron beam light source 128 includes a CRT 130 having disposed on a front surface thereof a flat glass faceplate 144 with a layer of phosphor elements 142 on an inner surface thereof. An elongated, linear, wire-like cathode 134 is disposed within the CRT 130 and substantially enclosed by an elliptically shaped, charged focusing electrode 132 having a lengthwise slot 132a therein. A medial plane, or axis, X-X' extends through CRT 130 and bisects focusing electrode 132. Cathode 134 is disposed on the medial plane X-X' and is located on a focal axis of focusing electrode 132. By locating cathode 134 on the focal axis of focusing electrode 132, electron beam 140 is focused on the inner surface of the CRT's faceplate 144. First and second deflection plates 136 and 138 are disposed adjacent to and on respective sides of the focusing electrode's slot 132a for deflecting electron beam 140 in a vertical direction across the CRT's faceplate 144 as previously described. A first focusing lens 148 focuses a light beam emitted through faceplate 144 onto LCD panel 146, while a second focusing lens 150 focuses light passing through the LCD panel onto projection screen 152.

There has thus been shown a projection LCD system wherein display panel backlighting is provided by a CRT. The CRT includes an electron beam source including an elongated, linear wire-like cathode and a beam focusing, concave, charged electrode disposed about the cathode and having an electron-passing slot extending substantially the entire length thereof for directing a focused electron beam onto the phosphor-bearing inner surface of the CRT's faceplate. The electron beam is in the form of an elongated, horizontal line which is focused on the CRT's faceplate by the concave charged electrode and which is deflected over the faceplate in a vertical direction by means of a pair of spaced, charged deflection plates disposed adjacent to and on opposing sides of the elongated slot in the focusing electrode. The electron beam is deflected in a stepwise manner synchronously with actuation of the horizontally aligned arrays of scanning electrodes on the LCD panel to illuminate only that portion of the display panel containing video information for improved video image brightness and contrast and more efficient display backlighting. The concave focusing electrode may assume various shapes such as an elongated cylinder or ellipsoid, with the cathode disposed along a focal axis of the electrode.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A projection display apparatus for projecting a video image on a screen comprising:

a liquid crystal display (LCD) panel including a generally planar layer of liquid crystal material and a first plurality of transparent scanning electrodes and a second plurality of transparent signal electrodes respectively disposed on first and second facing surfaces of said layer of liquid crystal material, wherein said first and second pluralities of electrodes are respectively arranged in first and second linear, spaced, parallel arrays and wherein said first and second arrays are mutually orthogonal such that each of said first linear arrays of scanning electrodes crosses each of said second linear arrays of signal electrodes, and wherein a voltage is applied to each linear array of scanning electrodes in a sequential manner such that video image information is presented sequentially on said LCD panel;

a cathode ray tube (CRT) including:

a faceplate disposed in facing relation to the second surface of said layer of liquid crystal material, said faceplate having a layer of phosphor elements disposed on an inner surface thereof;

electron beam generating means for directing an elongated, linear beam of energetic electrons on the inner surface of said faceplate and forming a narrow, elongated, linear light beam directed toward said LCD panel as said energetic electrons strike said phosphor elements, and wherein said elongated, linear light beam and beam of electrons are aligned generally parallel to said first linear arrays of scanning electrodes; and deflection means for deflecting said electron beam over the inner surface of said faceplate in a direction generally transverse to a longitudinal axis of said beam; and control means coupled to said first plurality of scanning electrodes and to said deflection means for synchronously applying a voltage to each linear array of scanning electrodes in sequence and deflecting said electron beam such that said light beam is sequentially directed upon each linear array of scanning electrodes as a voltage is applied to each of said arrays of scanning electrodes.

2. The projection display apparatus of claim 1 wherein said electron beam generating means includes an elongated, linear heated cathode for emitting energetic electrons.

3. The projection display apparatus of claim 2 wherein said cathode is in the form of a stretched wire.

4. The projection screen apparatus of claim 2 wherein said electron beam generating means further includes an elongated, hollow, concave grid disposed adjacent to and partially about said cathode, wherein said concave grid is maintained at a negative voltage relative to said cathode and includes a slot extending substantially the length thereof, wherein the energetic electrons are directed through said slot toward said faceplate.

5. The projection display apparatus of claim 4 wherein said elongated, linear concave grid has a focal axis, and wherein said cathode is disposed on said focal axis, and wherein said electron beam is focused on said faceplate by said concave grid.

6. The projection display apparatus of claim 5 wherein said elongated, hollow, concave grid is elliptical and includes at least one focal axis, and wherein said cathode is disposed on said at least one focal axis for focusing of said electron beam on said faceplate.

7. The projection display apparatus of claim 4 further comprising a voltage source coupled to said concave grid for maintaining said concave grid at a negative voltage relative to said cathode.

8. The projection display apparatus of claim 7 wherein said voltage source is variable for applying a variable negative voltage to said concave grid for controlling electron beam current density.

9. The projection display apparatus of claim 4 wherein said electron beam generating means further includes an elongated, cylindrical, charged grid disposed partially about said cathode, wherein said cylindrical grid includes a slot extending the length thereof, and wherein said energetic electrons are directed through said slot toward said faceplate.

10. The projection display apparatus of claim 9 wherein said cylindrical grid includes a focal axis extending the length thereof and wherein said cathode is disposed on said focal axis.

11. The projection display apparatus of claim 9 further comprising a variable voltage source coupled to said cylindrical grid for controlling electron beam current density.

12. The projection display apparatus of claim 1 wherein said electron beam generating means further includes means for focusing the electron beam on said faceplate.

13. The projection display apparatus of claim 4 wherein said deflection means includes first and second spaced, charged plates disposed adjacent the slot in said concave grid for deflecting said electron beam over the inner surface of said faceplate.

14. The projection display apparatus of claim 13 wherein said slot is generally linear and said first and second charged plates are generally planar and are aligned parallel to and on opposing sides of said slot.

15. The projection display apparatus of claim further comprising lens means disposed intermediate said faceplate and said liquid crystal display panel for focusing said light beam on each linear array of scanning electrodes.

16. A cathode ray tube (CRT) for backlighting a matrix-type projection liquid crystal display (LCD) panel wherein first scanning and second signal pluralities of linear, elongated, parallel transparent electrodes are disposed on facing surfaces of a layer of liquid crystal material with said first and second pluralities of electrodes arranged in mutually orthogonal arrays, and wherein a voltage is applied to each linear array of scanning electrodes in a sequential manner such that video image information is presented sequentially on said liquid crystal display, said CRT comprising:

a faceplate disposed in facing relation to the layer of liquid crystal material and having a layer of phosphor elements disposed on an inner surface thereof;

an elongated, linear heated cathode for emitting energetic electrons;

an elongated, linear concave grid disposed adjacent to and partially about said cathode and having a focal axis and a slot extending substantially the length thereof, wherein said cathode is disposed on said focal axis and said grid is maintained at a negative voltage relative to said cathode for directing said energetic electrons in the form of a focused, elongated, linear electron beam onto said faceplate for forming an elongated, linear light beam emitted from an outer surface of said faceplate onto the LCD panel; and deflection means for deflecting said electron beam over the inner surface of said faceplate in a direction generally transverse to a longitudinal axis of said beam and parallel to said first plurality of scanning electrodes.

17. The CRT of claim 16 further comprising a variable voltage source for controlling electron beam current density.

18. The CRT of claim 17 wherein said variable voltage source is coupled either to said concave grid or to said cathode for applying a variable voltage thereto for controlling electron beam current density.

19. The CRT of claim 16 wherein said deflection means includes first and second spaced, charged plates disposed adjacent to and on opposed sides of the slot in said concave grid for deflecting said electron beam over the inner surface of said faceplate.

20. The CRT of claim 16 wherein said cathode is in the form of a stretched wire and said concave grid is either cylindrical or elliptical in cross section.

* * * * *

UNITED STATES PATENT AND TRADEMARK OFFICE
CERTIFICATE OF CORRECTION

PATENT NO. : 5,303,054
DATED : April 12, 1994
INVENTOR(S) : Hsing-Yao Chen

It is certified that error appears in the above-identified patent and that said Letters Patent is hereby corrected as shown below:

| COLUMN | LINE | |
|---|---|---|
| 4 | 38 | "Polarlzers" should be --Polarizers-- |
| 4 | 51 | "upward" should be --downward-- |
| 6 | 8 | "upwardly in the direction of the arrow in FIG. 5" should be replaced with --downwardly-- |
| 6 | 10-11 | "an upwardly" should be replaced with --a downwardly-- |
| 6 | 16 | "as shown" should be replaced with --during retrace as shown by the direction of the arrow-- |
| 6 | 19-20 | "onto a lower portion of faceplate 70" should be deleted |
| 9 | 33 | After "claim", inserted should be --1-- |

Signed and Sealed this

Second Day of August, 1994

Attest:

BRUCE LEHMAN

Attesting Officer

Commissioner of Patents and Trademarks